United States Patent [19]
Dias et al.

[11] Patent Number: 5,592,069
[45] Date of Patent: Jan. 7, 1997

[54] BATTERY CHARGER

[75] Inventors: Donald R. Dias, Carrollton; Robert D. Lee, Denton, both of Tex.

[73] Assignee: Dallas Semiconductor Corporation

[21] Appl. No.: 957,571

[22] Filed: Oct. 7, 1992

[51] Int. Cl.⁶ .......................... H01M 10/44; H01M 10/46
[52] U.S. Cl. .............................................................. 320/30
[58] Field of Search .................................. 320/20, 31, 35, 320/14, 48, 30

[56] References Cited

U.S. PATENT DOCUMENTS

| | | | |
|---|---|---|---|
| 4,370,606 | 1/1983 | Kakumoto et al. | 320/35 |
| 4,385,269 | 5/1983 | Aspinwall et al. | 320/14 |
| 4,746,852 | 5/1988 | Martin | 320/14 X |
| 4,806,840 | 2/1989 | Alexander et al. | 320/20 |
| 4,965,738 | 10/1990 | Bauer et al. | 320/39 X |
| 5,164,652 | 11/1992 | Johnson et al. | 320/15 X |

*Primary Examiner*—Edward H. Tso
*Attorney, Agent, or Firm*—Jenkens & Gilchrist, P.C.

[57] ABSTRACT

A battery charger with charging parameter values derived from communication with a battery pack to be charged. Communication is over a one-wire bus with battery pack transmissions in response to charger inquiries. The battery charger may be in the form an integrated circuit driving a power transistor or other controllable DC supply. A battery pack may contain a program with multiple charging currents and charging interval termination methods such as time, temperature rise, and incremental voltage polarity. A lack of communication may be invoke a default charging program or denial of access to the charger. The charger also communicates over a high-speed three-wire bus with an external computer for analysis of identification information acquired from the battery and for control of the charger.

71 Claims, 6 Drawing Sheets

BATTERY CHARGER

CROSS-REFERENCE TO RELATED APPLICATIONS

U.S. patent application Ser. No. 953,906, filed Sep. 30, 1992, discloses related subject matter and is hereby incorporated by reference. This cross-referenced application is assigned to the assignee of the present application.

PARTIAL WAIVER OF COPYRIGHT PURSUANT TO 1077 O.G. 22 (3/20/87)

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTIONS

The present invention relates to electronic devices, and, more particularly, to devices useful for battery charging.

Battery Chargers

The widespread use of battery-powered portable computers (e.g., notebooks, laptops and palmtops) with high performance relies on efficient battery utilization. In particular, portable computers typically use rechargeable batteries (e.g., lithium, nickel-cadmium, or nickel metal hydride) which weight just a few pounds and deliver 4 to 12 volts. Such batteries provide roughly three hours of computing time, but require about three times as long to be recharged. Such slow recharging is a problem and typically demands that users have several batteries with some recharging while others are being used.

Figure 1A:
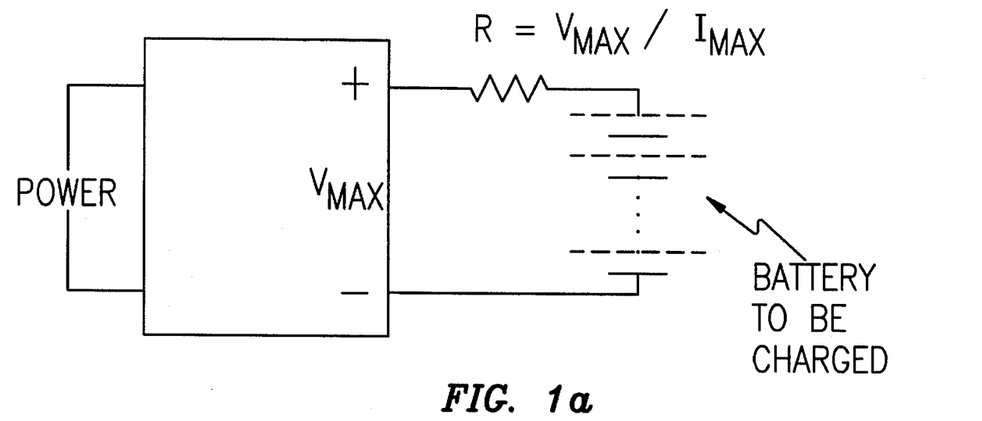
FIGS. 1a–b illustrate known battery chargers and their load lines.
Figure 1B:
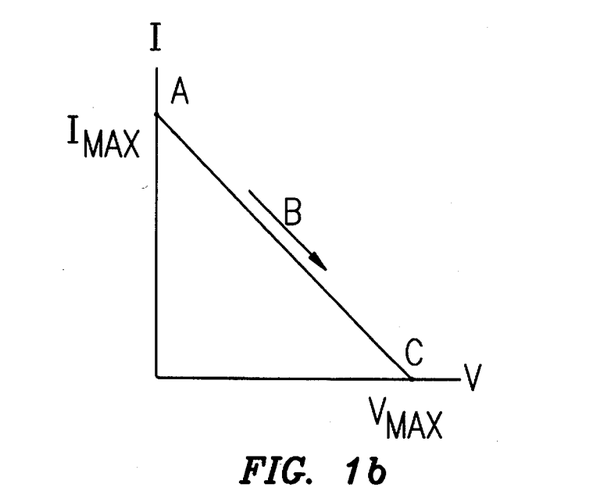

Known battery chargers apply a constant voltage across a discharged battery with the applied voltage determined by the maximum voltage acceptable by the battery. FIG. 1a heuristically illustrates such a battery charger with $V_{MAX}$ the maximum voltage acceptable by the battery and $I_{MAX}$ the maximum current; the resistor R and $V_{MAX}$ are the adjustable values. FIG. 1b is the load line for the battery charger of FIG. 1a and shows the charging current I as a function of the battery voltage V. As the load line shows, the charging current begins at $I_{MAX}$ with a totally discharged battery as indicated by point A. The battery rapidly charges and its voltage increases and the charging current decreases with the operating point moving down the load line as shown by arrow B. Then as the battery voltage rises to near $V_{MAX}$, the charging current falls to zero as indicated by point C. And the small charging current implies a large charging time. Indeed, most of the charging time will be during operation approaching point C.

Furthermore, the different chemistries of various battery types preferably use differing recharging voltages, and varying battery capacities (sizes) demand differing charging currents. However, known battery chargers cannot automatically adapt to such a variety charging conditions and remain simple to use.

Features

The present invention provides battery charging with charging parameter values selected by communication with imbedded information in a battery pack and then adjusted during charging. This permits adaptation to various battery chemistries and capacities, and, in particular, allows for approximately constant current charging at various current levels and for trickle charging.

BRIEF DESCRIPTION OF THE DRAWINGS

The present invention will be described with reference to the accompanying drawings, which are schematic for clarity.

DESCRIPTION OF THE PREFERRED EMBODIMENTS

Functional Overview

Figure 2:
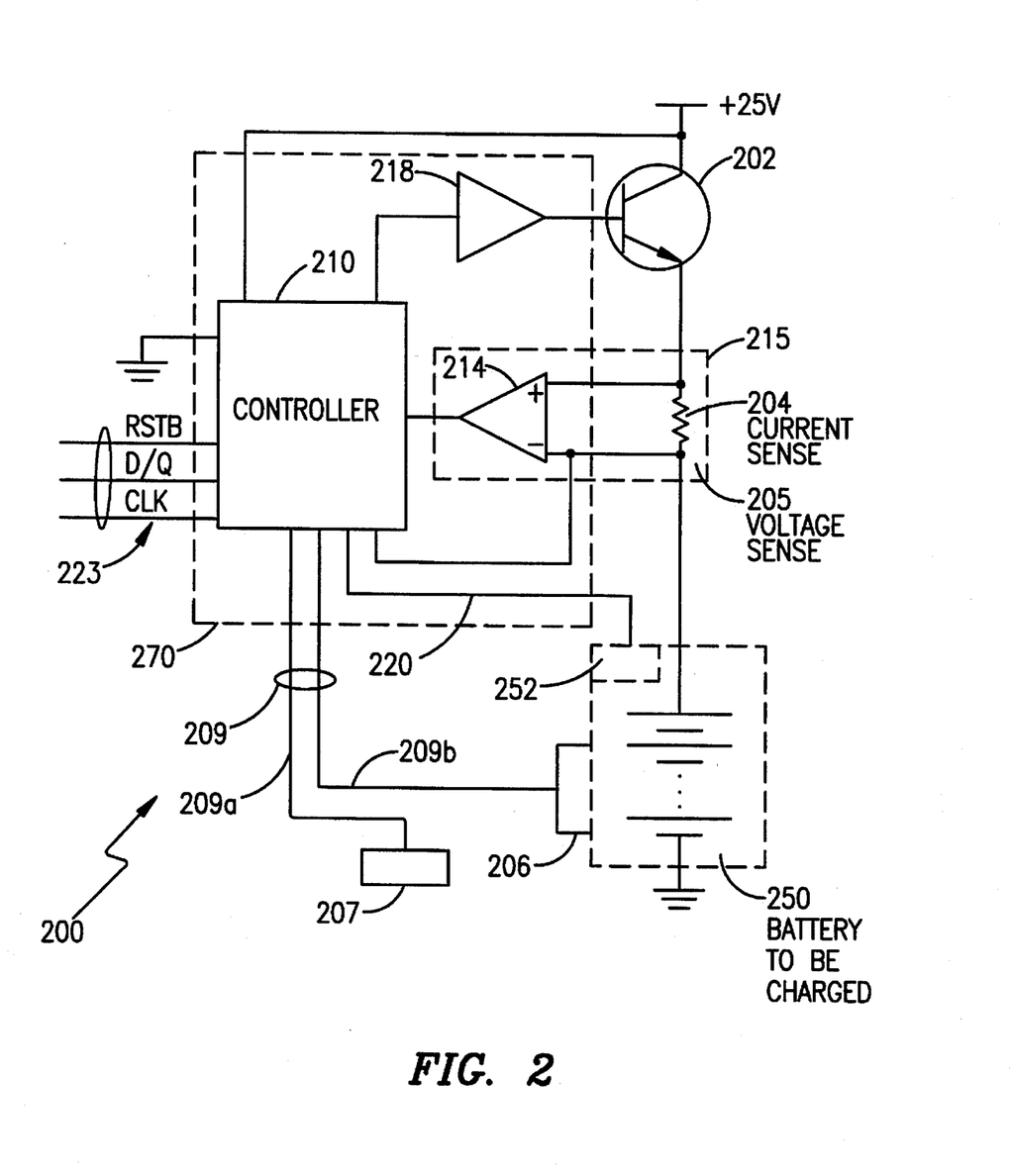
FIG. 2 is schematic functional block diagram of a first preferred embodiment battery charger.

FIG. 2 is a schematic functional block diagram of a first preferred embodiment battery charger, denoted generally by reference numeral 200, connected to charge battery pack 250 with communication module 252 which preferably follows a one-wire communication interface. Battery charger 200 includes power transistor 202, current sense resistor 204, voltage sense node 205, temperature sensor 206 affixed to battery pack 250, ambient temperature sensor 207, controller 210, operational amplifier 214, power transistor driver 218, one-wire communication bus 220, and three-wire bus 223. Referring to FIG. 2, controller 210 is coupled to battery pack 250 via communication terminal or bus 220. Portion 270 of battery charger 200 may be formed as a single integrated circuit and provide low cost and ruggedness.

Battery charger 200 can provide battery charging up to about 20 volts with 2.5 amp currents; this demands a separate power transistor 202 for cooling. Transistor 202 functions essentially as a current source and is coupled to controller 210 through driver 218. (More generally, power transistor 202 could be replaced by a DC-to-DC converter.) The current source also comprises a current level detector 215. Current level detector 215 comprises resistor 204 and difference amplifier 214 to detect the current level through resistor 204 and into battery pack 250 through output terminal 230. Controller 210 also comprises an analog-to-digital convertor to convert the analog current value detected by current level detector 215, which is used to compute the present voltage of the batteries in battery pack 250 through Ohm's law (since the resistance is constant and known). The present voltage is compared to stored values of previous values of the voltages of the batteries in battery pack 250, which were computed using the same method. Battery pack 250 may have various numbers of cells and cells of various chemistries which require various charging programs. Controller 210 acquires information about battery pack 250 through inquiry over the one-wire communication bus 220. In particular, communication module 252 within battery pack 250 contains identification plus charging parameter values, such as maximum voltage $V_{MAX}$ and maximum current $I_{MAX}$ along with charge time and endpoint detection method. Controller 210 reads the identification and charging parameter values and configures itself accordingly. Note that the identification can be used for access control: battery charger 200 can refuse to charge a battery pack with an invalid identification. Controller 210 also has stored (in nonvolatile ROM) default charging parameter values. Thus when controller 210 is unable to read charging parameter values from battery pack 250, it may read from its own ROM for default parameter values. After acquisition of parameter values, battery charger 200 begins charging battery pack 250. Battery charger 200 may also communicate at high speed over a second communication terminal, which is preferably a three-wire bus 223 with a computer or other controller; this permits external analysis of the identification and charging parameter values read from communication module 252 plus external control of access and the charging parameter values.

Operation

Figure 3:
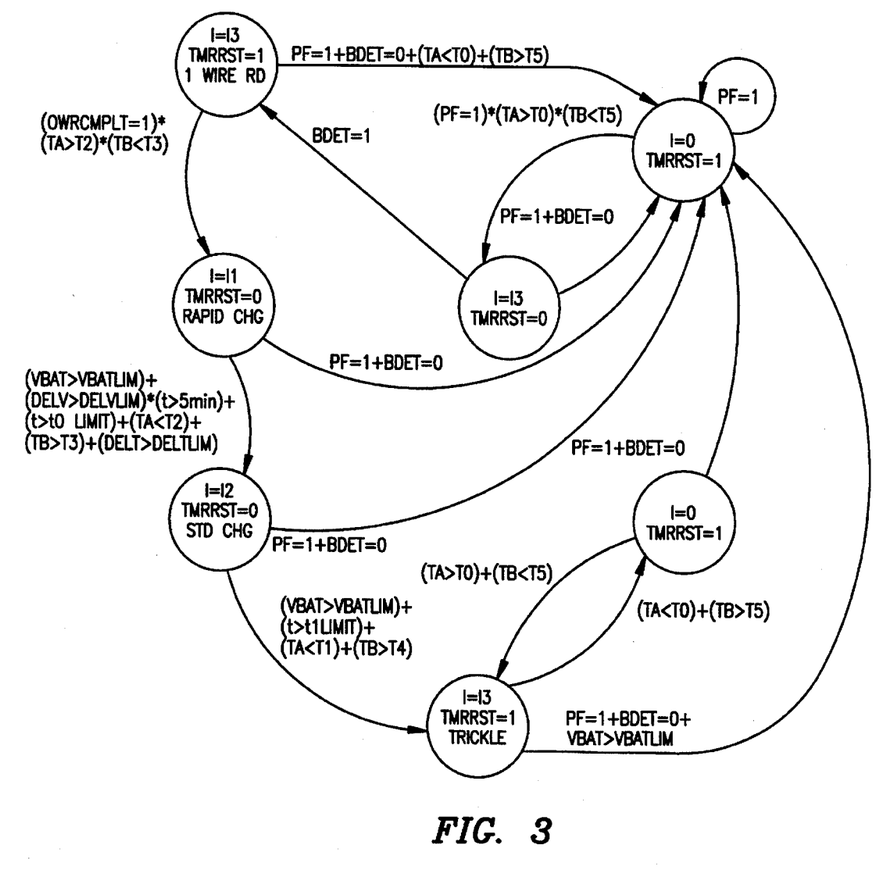
FIG. 3 is a state diagram for the first preferred embodiment.

FIG. 3 is a state diagram for battery charger 200 which describes its operation and the charging parameters used. Battery charger 200 begins in the upper righthand circle of FIG. 3 which represents the state of no power supply (PF=1). No power implies no charging current (I=0) because power transistor 202 cannot be turned on. Also, the charging timer within controller 210 will not be running (TMRRST=1). Controller 210 has an internal voltage regulator, so a 25 volt power supply may be used as illustrated to provide charging of multicell battery packs.

When power is supplied to charger 200 (PF=0), it first checks the inputs of temperature sensors 206 and 207; controller 210 converts the output of temperature sensors 206 and 207 to digital values, if necessary, using an analog-to-digital convertor housed inside controller 210, so that a comparator, which is embedded inside controller 210 can compare the temperature values outputted from temperature sensors 206 and 207. These values are inputted into controller 210 through temperature sensor input terminal 209, first temperature input terminal 209a and second temperature input terminal 209b. Temperature along with voltage and current are considered to be measured values, since they are routinely measured by controller 210, and if the battery temperature (TB) is less than the upper temperature limit for trickle charge (T5) and if the ambient temperature TA) is greater than the lower temperature for trickle charge (TO), battery charger 200 moves to an initial trickle charge state of applying a trickle charge current (I3). The circle in the center of FIG. 3 represents this initial trickle charge state (I=I3). The trickle charge current level is maintained by feedback from operational amplifier 214 measuring the charging current and then driving power transistor 202. This initial trickle charge state does not have the charging timer running (TMRRST=1) but does immediately detect the presence or absence of a battery pack 250 by detecting a positive or zero voltage at the voltage sense node 205. If no battery pack 250 is connected (BDET=0) or if a power failure occurs (PF=1), then battery charger 200 reverts back to the no power state. Contrarily, if battery charger 200 detects the presence of a connected battery pack, then battery charger 200 moves to the one-wire communication state represented by the circle in the upper lefthand corner of FIG. 3. That is, the initial trickle charge state is just a transient state battery.

In the one-wire communication state charger 200 maintains the trickle charge current to the connected battery pack 250 (I=I3) and the charging timer remains off (TMRRST=1). Further, battery charger 200 sends a reset signal over the one-wire communication bus 220 to initiate a read (1WIRE RD) of the identification and charging parameter values in communication module 252 of battery pack 250. Battery charger 200 either reads a recognizable identification to permit charging or not. When an acceptable identification is read but no charging parameter values, communication module 252 reads from its ROM default charging parameter values. Controller 210 loads the charging parameter values into registers to configure its various subcircuits for comparisons of measured charging parameters with the loaded values. If at any time during this one-wire communication power fails or battery pack 250 is disconnected or the ambient temperature falls below the trickle charge minimum or the battery temperature rises above the trickle charge maximum, battery charger 200 reverts to the no power state. Otherwise, after completing the one-wire communication (OWRCMPLT=1), battery charger 200 again checks the ambient and battery temperatures from sensors 206 and 207 and if the battery temperature is less than the upper temperature for rapid charge (T3) and if the ambient temperature is greater than the lower temperature for rapid charge (T2), then battery charger 200 switches to a state of rapid charge represented by the circle in the lefthand center of FIG. 3. However, if the temperatures do not satisfy the inequalities, battery charger 200 stays in the one-wire communication state and provides a trickle charge I3 to battery pack 250 until either a temperature changes, battery pack 250 is disconnected, or power failure occurs. Note that the rapid charge current level and temperature limits may be parameter values read from communication module 252.

In the rapid charge state controller 210 drives the charging current up to I1 and starts the charging timer (I=I1 and TMRRST=0). If there is a power failure or battery pack 250 is disconnected, then battery charger 200 again reverts to the no power state; otherwise, the rapid charge state persists and battery charger 200 supplies a charging current I1 to battery pack 250 until one of the following occurs: (1) the battery voltage parameter (VBAT) measured at voltage sense node 205 exceeds the parameter value (VBATLIM) read from communication module 252, (2) the parameter battery voltage delta (peak battery voltage sensed at voltage sense node 205 so far during the charging minus the battery voltage now sensed)(DELV) exceeds the parameter value (DELVLIM) read from communication module 252 and the charging timer has been running for more than 5 minutes, (3) the charging timer has been running longer than the time for rapid charge parameter value (t0LIM) read from battery module 252, (4) the ambient temperature is below parameter value T2, (5) the battery temperature is above parameter value T3, or (6) the battery temperature delta (equal to TB-TA)(DELT) exceeds the parameter value (DELTLIM) read from communication module 252. When one of these six events occurs, battery charger 200 moves to the standard charge state represented by the circle in the lower lefthand portion of FIG. 3. Note that the rapid charge termination events of significance depend upon battery cell chemistry; for example, nickel-cadmium cells have a voltage drop near maximum charge. This makes a positive battery voltage delta DELV a good indicator of full charge, with the size of a significant DELV varying with the number of cells in series in battery pack 250. Similarly, nickel-cadmium cells charge by an endothermic reaction and thus the battery temperature will not rise until full charge; this makes the battery temperature delta DELT another good indicator of full charge. Again, these parameter values such as DELTLIM, t0LIMIT, T2 may have been read from communication module 252 or could have been acquired over three-wire communication in the case of no communication module 252.

In the standard charge state controller 210 drives the charging current to I2 and restarts the charging timer (I=I2 and TMRRST=0). If there is a power failure or battery pack 250 is disconnected, then battery charger 200 again reverts to the no power state; otherwise, the standard charge state persists and battery charger 200 supplies a charging current I2 to battery pack 250 until one of the following events occurs: (1) the battery voltage (VBAT) sensed at voltage sense node 205 exceeds the maximum battery voltage during charge (VBATLIM), (2) the charging timer has been running longer than the maximum time for standard charge (t1LIM), (3) the ambient temperature is below the lower temperature limit for standard charge (T1), or (4) the battery temperature is above the upper temperature limit for standard charge (T4). When one of these four events occurs, battery charger 200 moves to the trickle charge state represented by the circle in the lower center of FIG. 3.

In the trickle charge state controller 210 drives the charging current back to I3 and stops the charging timer (I=I3 and TMRRST=1). If there is a power failure or battery pack 250 is disconnected or the battery voltage VBAT exceeds the maximum VBATLIM, then battery charger 200 once again reverts to the no power state; otherwise, the trickle charge state persists and battery charger 200 supplies a charging current I3 to battery pack 250 until either (1) the ambient temperature is below T0 or (2) the battery temperature is above T5. When one of these two events occurs, battery charger 200 moves to the standby state represented by the circle in the lower righthand portion of FIG. 3.

In the standby state controller 210 turns off power transistor 202 and stops the charging timer (I=I3 and TMRRST=1). If there is a power failure or battery pack 250 is disconnected, then battery charger 200 once again reverts to the no power state; otherwise, the stadby state persists with battery charger 200 not supply any charging current I3 to battery pack 250 until either (1) the ambient temperature is rises above T0 or (2) the battery temperature falls below T5. When one of these two events occurs, battery charger 200 returns to the trickle charge state from whence it came and repeats itself.

One-Wire communication

Figure 4:
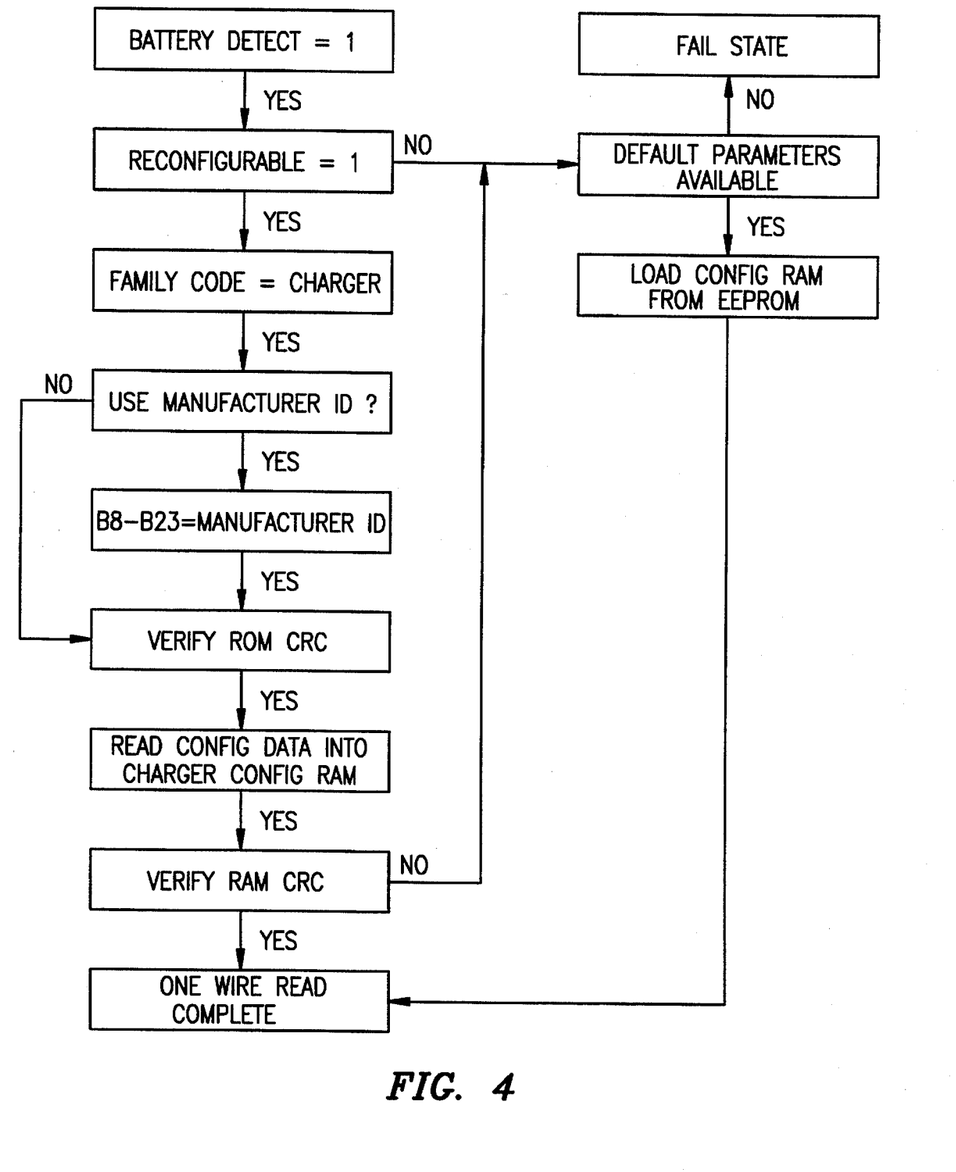
FIG. 4 is a flow chart for communication by the first preferred embodiment.
Figure 5:
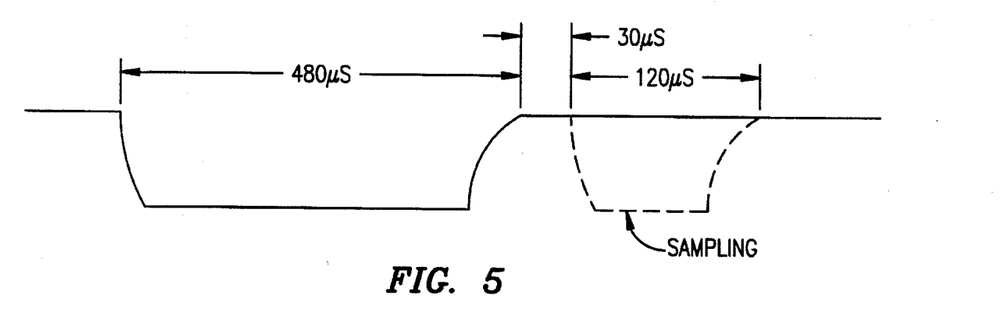
FIGS. 5–7 show communication waveforms.
Figure 6:
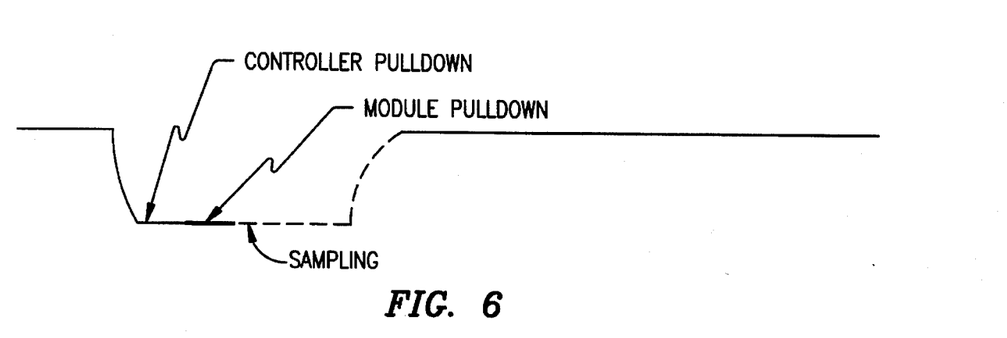
Figure 7:
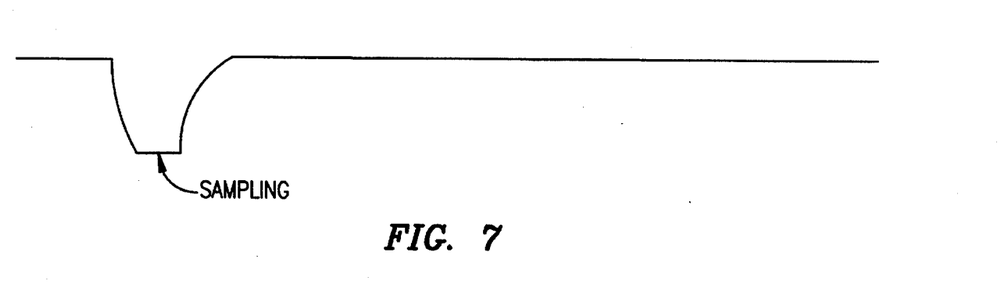

FIG. 4 is a flow chart of the communication by battery charger 200 with communication module 252 in battery pack 250, and FIGS. 5–7 illustrate signalling waveforms during one-wire communication. Controller 210 pulls the data line of communication bus 220 high (+5 volts) and this supplies the power to communication module 252 which includes an energy storage capacitor. The transient initial trickle charge state of battery charger 200 provides time for communication module 252 to store sufficient energy in its storage capacitor to power up its circuitry. Communication module 252 only responds to signals from controller 210, and thus only requires power when communicating. Thus communication module 252 can communicate with controller 210 even when battery pack 250 is fully discharged.

The flow shown of FIG. 4 begins with Battery Detect=1 which is the detection of battery pack 250 connected to voltage sense node 205; this corresponds to the movement from the initial trickle charge state to the communication state in FIG. 3. Controller 210 detects battery pack 250 by noting a positive voltage at voltage sense node 205 which derives from residual charge of battery pack 250 and initial charging by trickle charge being applied in the initial trickle charge state.

Once battery pack 250 has been detected, controller 210 applies a reset signal on the data line of one-wire communication bus 220 by driving the data line low (ground) for about 480 microseconds (μs) and then pulling the data line high (+5 volts) for about 480 μs. In response to the 480 μs low reset signal, communication module 252 signals its presence with a presence detect signal by pulling the data line low during the 480 μs high. The pulldown in communication module 252 overpowers the pullup of controller 210, so the data line goes low and controller 210 senses the low. Communication module 252 generates a nominal 120 μs time period for the pulldown presence detect pulse and applies this pulldown beginning a nominal 30 μs after controller 210 has returned the data line high. However, this time period may vary by a factor of 2 amongst communication modules, so controller 210 samples the data line at 65-70 μs after it has returned the data line high. See FIG. 5 which shows the waveforms on the data line. Controller 210 may repeatedly apply reset signals on the data line in order to account for the delay in the connection of one-wire bus 220 to battery pack 250 after the connection to voltage sense node 205.

If the sampling of the data line by controller 210 does not reveal a presence detect signal (Reconfigurable=1 not true in FIG. 4), then controller 210 will use its default charging parameter values by reading them from its memory (Default Parameters Available and Load Configur RAM From EEPROM in FIG. 4). Conversely, if controller 210 senses the data line low (Reconfigurable=1), then it continues with one-wire communication and drives the data line low for 1+μs and then pulls the data line high again to allow the response of communication module 252 to control the data line. Communication module 252 responds to the high-to-low transition by reading the first bit in its memory onto the data line: when the first bit is a 0, then communication module 252 pulls down the data line for a nominal 30μs so in effect the data line remains low and controller 210 detects this by sampling after 15μs. FIG. 6 shows the read 0 waveforms on the data line. Contrarily, when the first bit is a 1, then communication module 252 lets controller 210 pull up the data line; see FIG. 7. This process of a high-to-low by controller 210 followed by a pulldown or no pulldown response of communication module 252 proceeds through the memory of communication module 252 until all 320 bits (64 identification bits plus 256 charging parameter value bits) have been read. The total read time thus may be less than 50 milliseconds.

Figure 8:
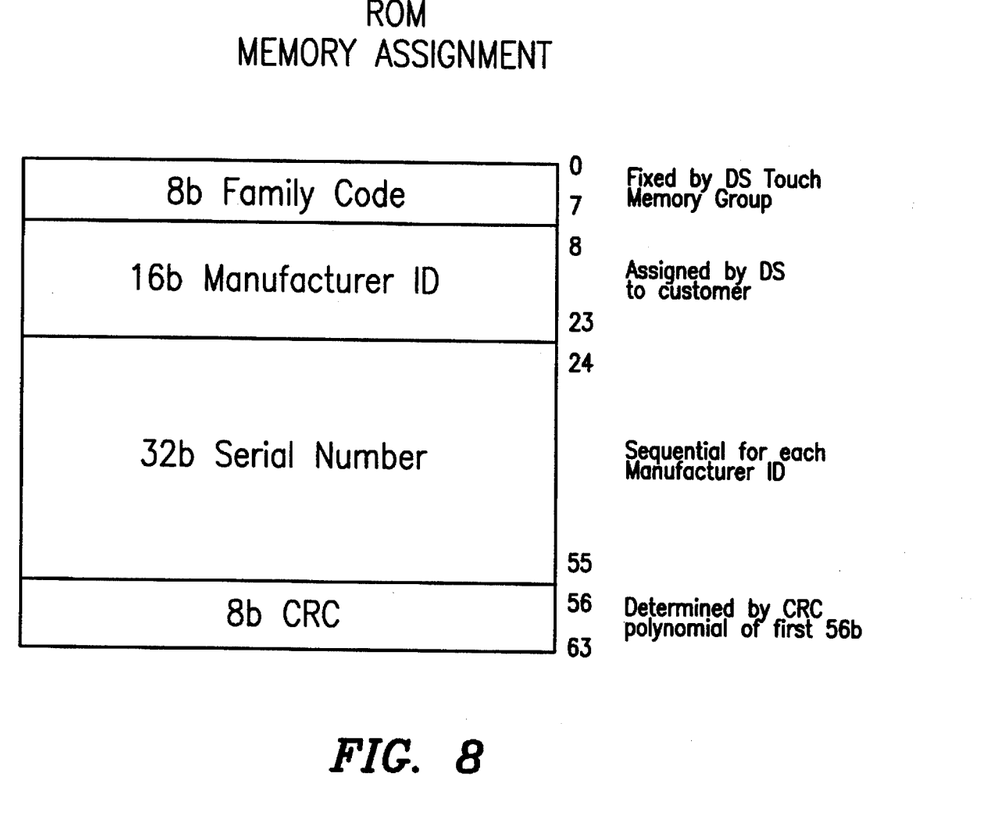
FIG. 8 illustrates identification memory organization.

Communication module 252 has two memories: a 64-bit ROM for identification and a 256-bit EEPROM for charging parameter values. FIG. 8 illustrates the content of the 64 bits of ROM. In particular, the first eight bits indicate the family of communication modules to which communication module 252 belongs (Family Code=Charger in FIG. 4). If this family is for a battery pack with a manufacturer's identification (Use Manufacturer ID in FIG. 4), then the next sixteen bits read (B8-B23=Manufacturer ID) may be decoded to check identification of the manufacturer of communication module 252 and perhaps prevent charging by battery charger 200. Lastly, after 64 bits have been read from the ROM, controller 210 applies a Cyclic Redundancy Check (CRC) algorithm to the first 56 bits to compare to the last eight bits to verify that the communication was error free (Verify ROM CRC).

After reading the ROM of communication module 252, controller 210 then reads the 256 bits of EEPROM to get charging parameter values for operation (Read Config Data Into Charger Config RAM). The reading of the parameter values is also checked by a CRC byte (Verify RAM CRC). Once the EEPROM has been read, the one-wire communication is complete (One Wire Read Complete in FIG. 4 and OWRDMPLT=1 in FIG. 3). Battery charger 200 then switches into the rapid charge state using the charging parameter values read from communication module 252.

U.S. Pat. No. 5,045,675 contains a discussion of one-wire communication and serial memory reading and is hereby incorporated by reference.

Further Modifications and Variations

The preferred embodiments may be modified in many ways while retaining one of more of the features of a battery charger with charging parameter values selected by communication with a battery pack to be charged and using multiple constant charging currents with multiple endpoint determinants. For example, the memory in the battery pack could be all ROM or all EEPROM, or EPROM, a mixture of two memory types; the communication could be over full duplex or other than one-wire, and the memory may have its own power supply to be operative with a discharged battery pack; sensors for endpoint determinants other than temperature increment and voltage increment may be used; the power transistor could be a switching AC-DC converter or a switching DC-DC converter; the controller may have nonvolatile memory or just registers for holding charging parameter values; and so forth.

What is claimed is:

1. A battery charging system, comprising
   a battery charger;
   a battery pack including:
      at least one rechargeable battery cell and a memory having stored therein charge instructions;
      said charge instructions comprising information instructing said battery charger of procedures for charging the at least one battery cell.

2. The battery charging system of claim 1, said battery charger comprising:
   (a1) a current source coupled to said battery pack to charge said rechargeable battery cell(s);
   (a2) a communication bus; and
   (a3) a controller controlling said current source in response to said charge instructions, said controller comprising communication circuitry electrically coupled to said communication bus;
   (a4) wherein said controller receives said charge instructions stored in said memory of said battery pack via a communication module electrically coupled to said communication bus and further wherein said controller executes and follows said charge instructions.

3. The battery charging system of claim 2, wherein:
   (a) said current source further comprising a current level detector with an output electrically coupled to said controller; and
   (b) said charge instructions comprising information pertaining to a current level detected by said current level detector.

4. The battery charging system of claim 2, wherein:
   (a) said controller further comprising a voltage level detector to detect battery voltage level of said battery(ies); and
   (b) said charge instructions comprising information pertaining to a voltage level detected by said voltage level detector.

5. The battery charging system of claim 2, wherein:
   (a) said controller further comprising a comparator to detect changes in voltages of said rechargeable battery cell(s); and
   (b) said charge instructions comprising information pertaining to a voltage range.

6. The battery charging system of claim 2, wherein:
   (a) said controller comprising a temperature comparator connected to at least one temperature sensor input terminal is electrically coupled to at least one temperature sensor; and
   (b) said charge instructions comprising a temperature increment determined by said temperature comparator.

7. The battery charging system of claim 2 wherein:
   (a) said controller receiving an identification signal from said battery pack, said controller uses said identification signal to permit access to said battery pack.

8. The battery charging system of claim 1, wherein said charge instructions are comprised of information selected from the group consisting of temperature ranges, voltage levels, current levels, and any combination thereof.

9. The battery charging system of claim 1, wherein said battery charger comprises a
   (a) a current control output terminal;
   (b) a communication terminal; and
   (c) a controller connected to said current control output terminals, wherein said controller comprises communication circuitry to receive said charge instructions from said battery pack via a communication channel, said communication circuitry having a communication module electrically coupled to said communication terminal, and wherein said controller further comprises a driver connected to said current control output terminal and which can control a current source to charge said rechargeable battery cell(s), said driver controlled by said charge instructions.

10. The battery charging system of claim 9, wherein said communication circuitry provides power at said communication terminal to said communication module.

11. The battery charging system of claim 9, wherein
    said controller comprising a voltage level detector electrically coupled to a voltage level input terminal,
    said controller comprising a current level detector electrically coupled to a first and a second current level detector input terminal,
    said controller comprising a first temperature sensor electrically coupled to a first temperature input terminal,
    said controller comprising second communication circuitry electrically coupled to a second communication terminal, wherein said charge instructions comprise information selected from the group consisting of voltage level, current level, temperature levels, identification information, and any combination thereof; and
    wherein said controller acquires temperature information from said first temperature sensor, voltage information from said voltage level input terminal, and identification information from communication over said second communication terminal, and
    said controller can follow said charge instructions in conjunction with outputs of said voltage level detector, said current level detector, and said first temperature sensors, and said identification information to control said driver.

12. The battery charging system of claim 11, further comprising a second temperature sensor, said second temperature sensor electrically coupled to a second temperature input terminal, wherein said controller acquires temperature information from said second temperature sensor.

13. The battery charger system of claim 11, further wherein said communication channel comprises a data wire and a ground wire.

14. The battery charging system of claim 11, further wherein said communication channel comprises exactly one electrical connection and said communication circuitry housed in said controller and said communication module housed in said communication module provides a multiplexed interface for said one electrical connection therebetween.

15. The battery charging system of claim 1, wherein said rechargeable battery cell(s) together form a battery, said battery having a battery chemistry selected from the group consisting of lithium, nickel.

16. The battery charging system of claim 1, wherein said rechargeable battery cell(s) are used to power a host system.

17. The battery charging system of claim 1, wherein said host system is a personal computer.

18. The battery charging system of claim 1, wherein said rechargeable battery cell(s) when combined form a battery, said battery weighing just a few pounds and delivering 4–12 volts.

19. The battery charging system of claim 1, wherein said procedures are selected from the group consisting of constant current charging at various current levels, trickle charging, and any combination thereof.

20. The battery charging system of claim 1, wherein said memory is selected from the group consisting of nonvolatile ROM, EEPROM, EPROM, and any combination thereof.

21. The battery charging system of claim 1, wherein said battery charger communicates with a host system.

22. The battery charging system of claim 21, wherein said battery charger communicates with a host system via a bus.

23. The battery charging system of claim 21, wherein said bus is a three-wire bus.

24. The battery charging system of claim 1, wherein said memory is electrically coupled to a memory power supply.

25. The battery charging system of claim 24, wherein said memory power supply is distinct from said rechargeable battery cell(s).

26. The battery charging system of claim 24, wherein said memory power supply is distinct from a system power supply powering said battery charger.

27. The battery charging system of claim 1, wherein said battery pack has a second memory to store an identification code, said battery charger decodes said identification code to determine whether said battery charger should charge said rechargeable battery cell(s) on said battery pack.

28. A battery pack, comprising at least one rechargeable battery cell and at least one memory having stored therein charge instructions;

said charge instructions comprising information instructing a battery charger of procedures for charging the at least one rechargeable battery cell.

29. The battery pack of claim 28, wherein said charge instructions comprise charging information selected from the group consisting of a current level used to charge said rechargeable battery cell(s), a voltage level corresponding to said rechargeable battery cell(s), voltage ranges corresponding to changes in a voltage level(s) of said rechargeable battery cell(s), temperature ranges corresponding to a temperature(s) of said rechargeable battery cell(s) and to an ambient temperature, identification code(s) corresponding to said rechargeable battery cell(s), and any combination thereof.

30. The battery pack of claim 28, wherein said rechargeable battery cell(s) form a battery, said battery having a battery chemistry are selected from the group consisting of lithium, nickel-cadmium, or nickel metal hydride.

31. The battery pack of claim 28, wherein said rechargeable battery cell(s) are used to power a host system.

32. The battery pack of claim 31, wherein said host system is a personal computer.

33. The battery pack of claim 28, wherein said rechargeable battery cell(s) form a battery, said battery weighing just a few pounds and delivering 4–12 volts.

34. The battery pack of claim 28, wherein said procedures are selected from the group consisting of constant current charging at various current levels, trickle charging, and for and combination thereof.

35. The battery pack of claim 28, wherein said memory is selected from the group consisting of nonvolatile ROM, EEPROM, EPROM, and any combination thereof.

36. The battery pack of claim 28, wherein said memory is electrically coupled to a memory power supply.

37. The battery pack of claim 28, wherein said battery pack has a second memory to store an identification code.

38. The system of claim 1, wherein said information comprises digital information.

39. The system of claim 1, wherein said battery pack is adapted to power a personal computer.

40. The system of claim 1, wherein said battery pack is adapted to power a cellular telephone.

41. The system of claim 1, wherein said battery pack is adapted to power a video camera.

42. The system of claim 1, wherein said battery pack is adapted to power an electronic device.

43. The system of claim 1, wherein said battery pack is adapted to power an electrically operated device that uses a rechargeable battery.

44. A battery charging system comprising:

means for receiving information from a rechargeable battery; and means for selecting one of a plurality of procedures for charging said rechargeable battery based upon said received information.

45. A battery charger comprising:

means for receiving charge instructions from a rechargeable battery; and means for selecting a procedure for charging said rechargeable battery based upon said charge instructions.

46. A battery charger comprising:

means for charging a conventional rechargeable battery; and means for selecting a procedure for charging a rechargeable battery, having a memory associated therewith, based upon information received from the memory.

47. A circuit which is useable in a battery charger, said circuit comprising:

means for receiving charge instructions from a rechargeable battery; and means for controlling charging procedures based upon said charge instructions.

48. A circuit which is useable in a rechargeable battery pack, said circuit comprising:

means to provide information to a charger circuit; and means to cause the selection of a procedure to provide a charge to said battery pack based at least in part on said provided information.

49. A battery management circuit comprising:

means to couple said battery management circuit to a rechargeable battery pack;

memory means associated with said battery management circuit, having stored therein identification data; and means for communicating the identification data to a battery charger, the identification data enabling the charger to select a procedure for charging the rechargeable battery pack.

50. A battery management circuit for a battery, said battery management circuit comprising:

an interface to a battery charger; and means for transmitting information to said battery charger, said transmitted information used by said battery charger to select a procedure for charging said battery.

51. A battery pack comprising:

at least one rechargeable battery cell and at least one memory having stored therein information;

said information comprising address information for accessing a procedure for a battery charger to charge the at least one rechargeable battery cell.

52. A battery pack comprising:

at least one rechargeable battery cell and at least one memory having stored therein identification data;

said identification data providing a battery charger with information as to selection of a procedure for charging said at least one rechargeable battery cell.

53. A battery pack comprising:

means for coupling said battery pack to a system that implements procedures for charging batteries; and means for conveying information to said system, which information is used to affect the charging procedure.

54. The battery pack of claim 53, wherein said information comprises at least battery-capacity monitor information.

55. The battery pack of claim 53, wherein said information comprises at least charge instructions.

56. The battery pack of claim 53, wherein said information comprises at least data used for selecting charge instructions.

57. A battery management circuit comprising:

means for coupling to a system that implements procedures for charging batteries; and means for conveying information to said system, which information is used to affect the charging procedure.

58. The battery management circuit of claim 57, wherein said information comprises at least battery-capacity monitor information.

59. The battery management circuit of claim 57, wherein said information comprises at least charge instructions.

60. The battery management circuit of claim 57, wherein said information comprises at least data used for selecting charge instructions.

61. A method for charging a battery cell within a battery pack, said method comprising the steps of:

receiving information from said battery pack; and selecting a charging procedure for said at least one battery cell based upon the received information.

62. A method for providing for the charging of a battery cell within a battery pack, said method comprising the steps of:

providing for receiving information from said battery pack; and providing for selecting a charging procedure for said at lean one battery cell based upon the received information.

63. The method of claim 61, wherein said information is received in digital form.

64. The method of claim 62, wherein said information is received in digital form.

65. A method for providing for the charging of a battery cell within a battery pack, said method comprising the steps of:

providing for transmitting information from said battery pack; and providing for selecting a charging procedure for said at least one battery cell based upon said received information.

66. The method of claim 65, wherein said information is transmitted in digital form.

67. The method of claims 61, 62, 63, 64, 65 or 66, wherein said information comprises identification information.

68. The method of claims 61, 62, 63, 64, 65 or 66, wherein said information comprises address information.

69. A method for charging a rechargeable battery pack including at least one battery cell, said method comprising the steps of:

storing information in said rechargeable battery pack, said stored information instructing a battery charger of procedures for charging said at least one battery cell.

70. A method for enabling the charging of a rechargeable battery pack including at least one battery cell, said method comprising the steps of:

providing for the storing of information in said rechargeable battery pack; and providing for instructing a battery charger of procedures for charging said at least one battery cell based at least in pan on said stored information.

71. A method for charging a rechargeable battery pack including at least one battery cell, said method comprising the steps of:

storing procedures for charging battery cells in said battery charger; and selecting a procedure based upon information received from said rechargeable battery pack.

* * * * *

UNITED STATES PATENT AND TRADEMARK OFFICE
CERTIFICATE OF CORRECTION

PATENT NO : 5,592,069
DATED : January 7, 1997
INVENTOR(S): Dias, et al.

It is certified that error appears in the above-identified patent and that said Letters Patent is hereby corrected as shown below:

| | |
|---|---|
| Column 3, line 47 | Replace "temperature TA)" With --temperature (TA)-- |
| Column 3, line 48 | Replace "TO" With --T0-- |
| Column 3, line 64 | Replace "comer" With --corner-- |
| Column 3, line 65 | Replace "transient state battery" With --transient state-- |
| Column 3, line 66 | Replace "state charger" With --state battery charger-- |
| Column 4, line 49 | Replace "battery" With --communication-- |
| Column 5, line 5 | Replace "(I=I2)" With --(I=I2-- |

UNITED STATES PATENT AND TRADEMARK OFFICE
CERTIFICATE OF CORRECTION

PATENT NO : 5,592,069
DATED : January 7, 1997
INVENTOR(S): Dias, et al.

It is certified that error appears in the above-identified patent and that said Letters Patent is hereby corrected as shown below:

Column 5, line 29    Replace "TO"
                     With --T0--

Column 5, line 37    Replace "stadby"
                     With --standby--

Column 5, line 40    Replace "TO"
                     With --T0--

Column 5, line 49    Replace "of communication"
                     With --of one-wire communication--

Column 6, line 15-16 Replace "amongst communication modules"
                     With --amongst modules--

Column 6, line 20    Replace "one-wire bus"
                     With --one-wire communication bus--

UNITED STATES PATENT AND TRADEMARK OFFICE
CERTIFICATE OF CORRECTION

PATENT NO. : 5,592,069
DATED : January 7, 1997
INVENTOR(S) : Dias, et al.

It is certified that error appears in the above-identified patent and that said Letters Patent is hereby corrected as shown below:

| | |
|---|---|
| Column 6, line 52 | Replace "of communication modules" With --of modules-- |
| Column 9, line 10 | Replace "nickel." With --nickel-cadmium, or nickel metal hydride.-- |
| Column 10, line 67 | Replace "battery charger," With --charger,-- |
| Column 12, line 7 | Replace "lean" With --least-- |
| Column 12, line 44 | Replace "pan" With --part-- |
| Column 12, line 48-49 | Replace "said battery charger;" With --said charger;-- |

Signed and Sealed this

Fifth Day of December, 2000

Attest:

Q. TODD DICKINSON

*Attesting Officer*       *Director of Patents and Trademarks*